No. 812,318. PATENTED FEB. 13, 1906.
W. B. YATES.
AUTOMATIC DRIVING AND REVERSING MECHANISM.
APPLICATION FILED SEPT. 19, 1904.

2 SHEETS—SHEET 1.

WITNESSES: INVENTOR
G. K. Throckmorton W. B. Yates
C. A. Malefyt By Lucien D. Yeomans
ATTORNEY

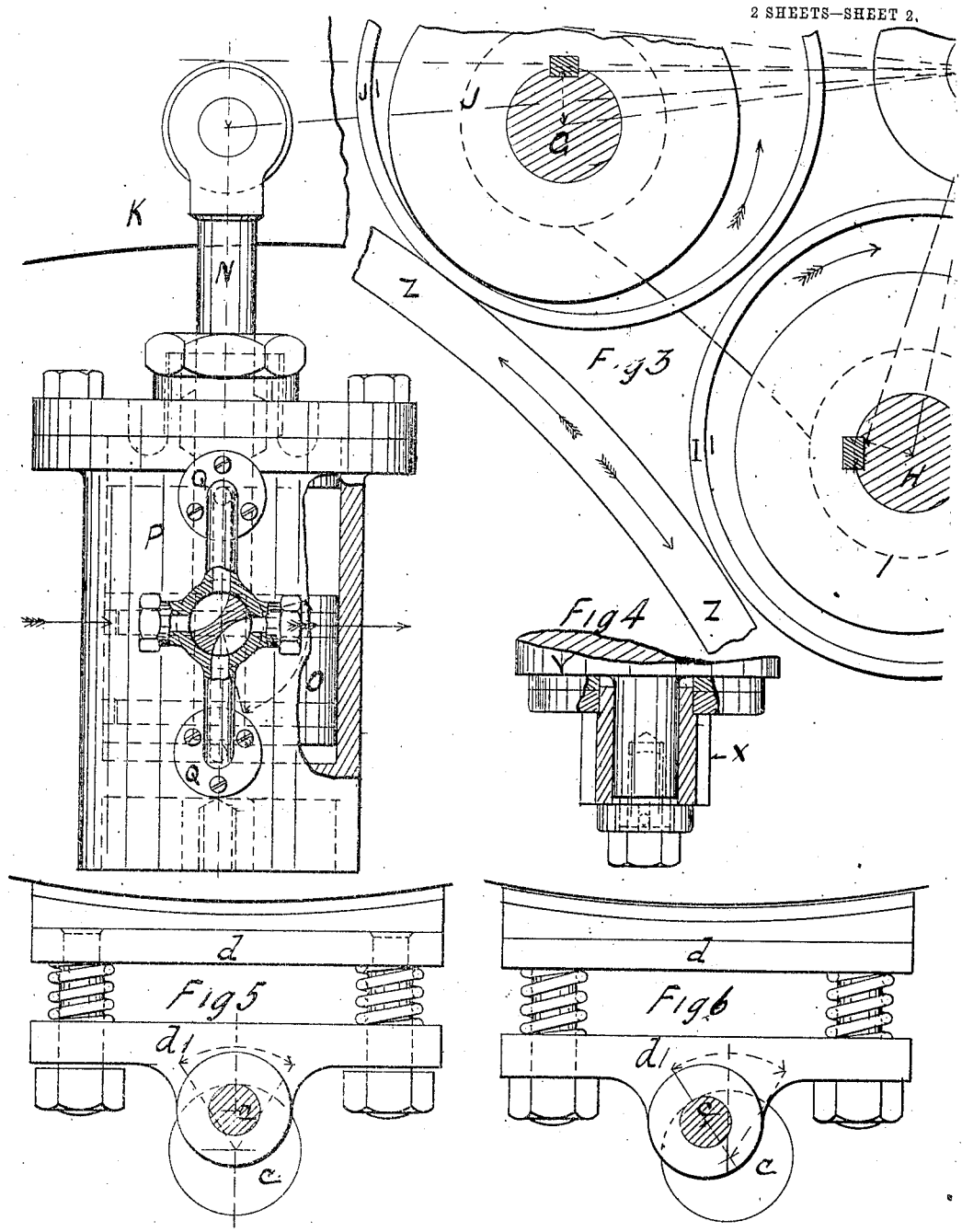

UNITED STATES PATENT OFFICE.

WILLIAM B. YATES, OF CHICAGO, ILLINOIS.

AUTOMATIC DRIVING AND REVERSING MECHANISM.

No. 812,318.      Specification of Letters Patent.      Patented Feb. 13, 1906.

Application filed September 19, 1904. Serial No. 225,110.

*To all whom it may concern:*

Be it known that I, WILLIAM B. YATES, a citizen of the United States of America, and a resident of Chicago, in the county of Cook and State of Illinois, have invented certain new and useful Improvements in Automatic Driving and Reversing Mechanisms, of which the following is a specification.

This invention has for its purpose the automatic reversal of machinery when using only one pulley as a driver, or a first motion shaft rotating at all times in one direction.

I do not limit myself to rotating the driving-shaft by a pulley or gear driven from a train or belt, as other means may be used to accomplish this end, as an electric motor, steam or gas engine, water motor or turbine, running only in a given direction, in which the driving-shaft may be a part of the apparatus, communicating motion to the driving-shaft in one direction, or the various forms of motors may be separate machines and the power transmitted by belt, chain, rope, gearing or one of the various forms of ordinary use, since the essential features of this invention lie not in what means gives motion to a driving shaft or pulley, but in producing a reversal in a machine automatically or by hand, if so desired, from a driving shaft or pulley rotating in one direction only.

In illustrating and describing this invention I have shown it attached to a rotary washing-machine, as used in steam-laundries, where the rotating vessel containing the articles being washed is reversed automatically at a determined point, which may be two to three revolutions, by means of straight and crossed belts, shifted on pulleys in the usual method, but by a single belt and pulley in my improved device.

Figure 1:
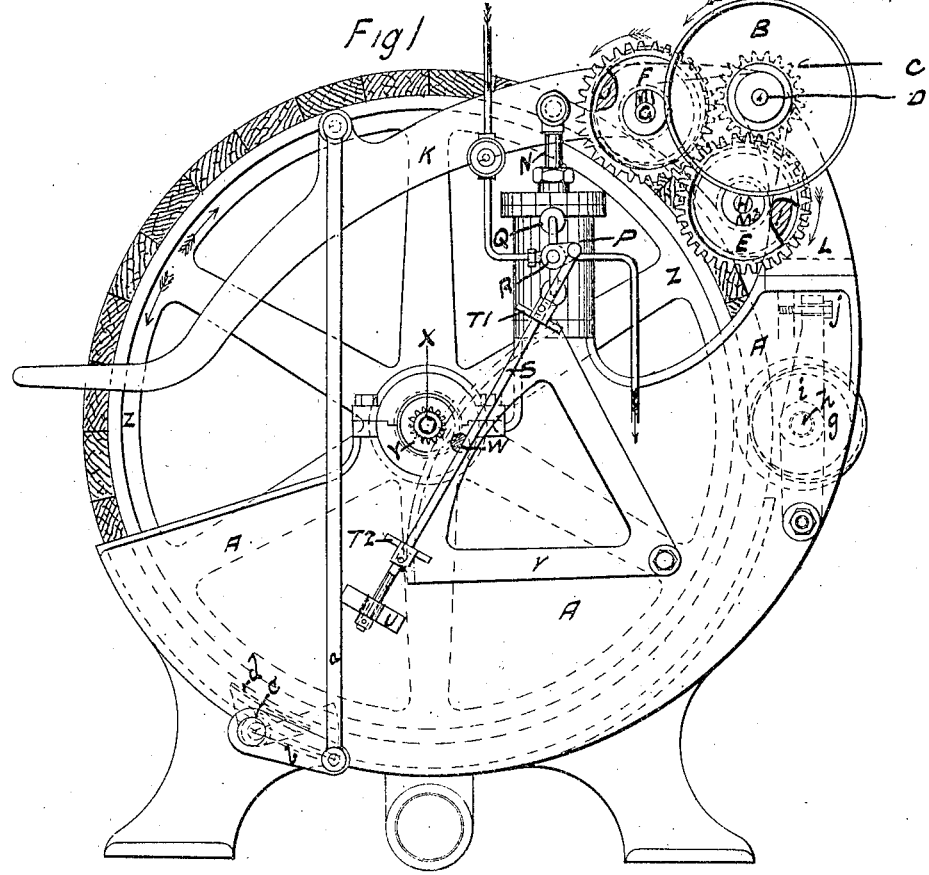
Figure 2:
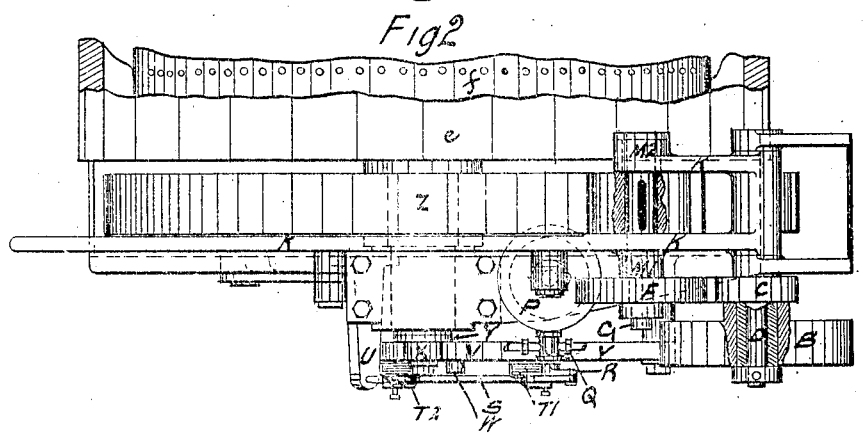

Figure 1 is a general elevation of the device as attached to a rotary washing-machine. Fig. 2 is a plan view of the same. Fig. 3 is an enlarged view showing the pressure-cylinder with four-way cock, its connection with the friction driving-wheels, and their relation to the large friction-wheel which is fast on the trunnion of the cylindrical vessel. Fig. 4 shows the sector driving-pinion and its connection frictionally with the end of the trunnion. Fig. 5 is an enlarged view of the brake-shoe and eccentric operating spindle in action, and Fig. 6 shows the same released from its controlling contact.

Like letters of reference in all the figures denote like parts.

In Figs. 1 and 2, A is the general housing supporting the various members of this device in combination. B is a single belt-pulley secured on the quill of the driving-pinion C, which rotates in one direction on the trunnion D, meshing with and driving toothed gear E, which meshes with and drives toothed gear F. These toothed gears E and F are fast on their respective spindles G and H, and the friction driving-rolls I and J are also fast, respectively, on spindles H and G.

K is a swinging cradle swinging on trunnion D, supported in the bracket L, which in turn is supported on and securely bolted to the housing A.

Spindles G and H are journaled and revolve in their respective bearings $M'$ $M^2$ $M^3$ $M^4$ of the swinging cradle K.

Attached to the long side of the swinging cradle K is a piston-rod N of the piston O of the pressure-cylinder P. Attached to the pressure-cylinder P is a four-way cock Q, whose plug and spindle are pinned to the lever R, and this in turn is connected with the tappet-rod S, which carries sliding tappet-plates $T'$ and $T^2$, bracket U supporting the other end of tappet-rod S, which has a sliding movement through the bracket for a determined distance, and the sliding part of rod S is preferably cylindrical.

V is a toothed sector carrying the tappet-pin W, and X is a toothed pinion frictionally attached to trunnion Y and gives motion to the toothed sector V. On trunnion Y is keyed the large driven friction-wheel Z.

*a* is a connection from the swinging cradle K to the brake-lever *b*, attached to the eccentric spindle which supports and gives motion to the brake-shoe *d*. The eccentric spindle has its bearings in the housing A.

*e* is the outside casing of the washer, *f* the revolving cylindrical vessel, both shown in section, and *g* is a friction-wheel secured to shafting supported in the swinging arm *i*, while *j* is a pressure-bolt pressing friction-wheel *g* toward the large friction-wheel Z.

The friction driving-wheels are shown provided with elastic contact-collars $J'$ and $I'$.

The operation of automatic reversal is as follows: The pulley B, attached to gear C, revolves always in one direction and gives motion to gear E and friction driving-wheel I, both of which are keyed on spindle H and revolve in an opposite direction to B and C. Gear E meshes with gear F, which, with the friction driving-roll J, is keyed on spindle G and has opposite direction of motion to E and I. These friction driving-rolls are brought alternately in contact with the large friction-wheel Z and give it motion in one direction or the opposite. This alternate contact is attained through the swinging cradle K, pivoted on the trunnion D. To propel the large friction-wheel Z by either of the friction driving-rolls I or J, pressure must be applied to the friction-surface in contact and maintained positively until reversal takes place. This pressure in either direction is derived from the movable piston O in the pressure-cylinder P, connected to the swinging cradle K by the piston-rod N. It is seen that to give pressure in both up and down direction of the piston O the pressing medium, which may be steam, water, compressed-air, or other available fluid, must be admitted alternately to either side of the piston, and this is done by suitable valve mechanism actuated by the member to be reversed and in some cases by hand-lever or treadle, at the will of the operator. As shown in the drawings forming a part of this specification, this admission to and exhaust from the cylinder of the pressure medium is through the four-way cock Q, the plug of which receives its vibratory motion from the tappet-pin W of the sector V, striking the tappet-plates T' and T². The vibratory movement of the plug is through an arc of ninety degrees for a four-way cock whose ways are at right angles to each other, and this amount of motion is positively determined by suitable stops. The toothed sector V receives its motion from the toothed pinion X, held by frictional contact to the end of the trunnion Y.

The form of stop shown in Fig. 1 is secured by making one end of the square tappet-rod S round for the required amount of motion, this round part sliding through the supporting-bracket U and having a collar pinned on the end.

Since the vibratory motion of the four-way cock Q and its movable connections R, S, and V is of a determined positive amount, it is obvious that any movement beyond this would cause breakage of some of the parts, and to prevent this some compensatory means is required. It is not always possible to stop a heavily-loaded revolving cylinder of a machine of this class at an exactly-predetermined point. The momentum of the moving mass must be absorbed, and even with an excellent brake it is not absolute; hence the need of compensatory means. This is attained by frictional attachment of the pinion X to the trunnion of the revolving cylinder, and the amount of friction required to drive the sector V being small the pinion will slip easily on the trunnion, preventing breakage of the members in connection with the plug of the four-way cock.

In machines of this class a means of varying the travel between reversals readily is a desideratum. Referring to Fig. 1, it will be readily seen that by varying the position of the tappet-plates T' and T² along the rod S the travel between reversals may be increased or diminished.

The brake-pressure is applied to the large friction-wheel Z by the vibratory motion communicated to the eccentric brake-spindle c operating to and fro the brake-shoe d. The brake-pressure is greatest on wheel Z when the brake eccentric spindle is midway in its motion and is entirely released at the extremity of either throw, the point at which the friction driving-rolls will one or the other be in driving contact with the friction-surface of Z.

I do not limit myself to any particular style of friction-gearing, as many are suitable for this purpose and are details of ordinary acceptance in design and the subjects of expired patents of Evans and others. Neither do I limit myself to merely reversing the cylinder of a washing-machine, as with modifications in construction which do not impair the essence of the invention it may be adapted to provide a reversing means for various machines and apparatus and for either reciprocating or rotating parts; nor do I claim anything but cylindrical friction-surfaces or an equal ratio of forward and reverse movement, as it is evident that surfaces of disks in contact or variable ratios of forward and reverse movement are equally well adapted to be incorporated with such a mechanism without departing from the spirit of my invention; but What I do claim as new, and desire to secure by Letters Patent, is—

1. A frictional transmission mechanism having a plurality of driving members, a driven member, and fluid-pressure-operated means adapted to alternately bring said driven member into engagement with said driving members.

2. In a driving and reversing mechanism, a plurality of positively-driven friction-rolls rotating in opposite directions, a driven member adapted to contact with said rolls at predetermined intervals, and a fluid-pressure organ for controlling said contact.

3. A driving and reversing mechanism having a plurality of positively-driven friction-rolls rotating in opposite directions, a member adapted to be driven in opposite directions by frictional contact with said rolls and means adapted to cause said contact at predetermined intervals.

4. A friction driving and reversing mechanism having a plurality of positively-driven friction-rolls, a driven member, a fluid-pressure cylinder and piston, and transmission mechanism between said piston and friction-rolls adapted to alternately bring said rolls into driving contact with the driven member.

5. In a friction driving and reversing mechanism, a single power-shaft moving constantly in one direction, a plurality of friction-rolls driven in unison, in opposite directions, by said shaft, swinging journals within which the rolls are mounted, a driven member adapted to receive alternately motion in either direction through contact with the rolls, a fluid-pressure organ connected with the swinging journals of the rolls for the purpose of forcing them alternately into contact with the driven member at predetermined intervals, and means whereby the travel of the driven member admits fluid-pressure to one and the other side of the fluid-pressure organ, causing reversal of the direction of motion at predetermined intervals.

6. In a driving and reversing mechanism, a prime mover running in one direction, a swinging cradle, suitable gearing carried thereby, and friction driving-rolls, with a fluid-pressure mechanism adapted to operate the swinging cradle to give said rolls the necessary pressure for propulsion.

7. In a reversing mechanism, the combination of a prime mover running in one direction, a swinging cradle, suitable gearing carried thereby, and friction driving-rolls, with a valve-operated pressure mechanism adapted to alternate the pressure on said rolls, to give the necessary contact for propulsion in one or the other direction.

8. In a reversing mechanism, the combination of a prime mover running in one direction, and a swinging cradle, suitable positive, power-transmitting gearing and friction driving and pressure-giving mechanism for propulsion carried thereby, with a suitable valve or cock, tappet-rod, tappet-plate, sector or rack carrying a tappet-pin, all operated from the body to be reversed.

9. In a reversing mechanism, the combination of a prime mover revolving in one direction a swinging cradle, suitable positive, power-transmitting gearing and friction driving and pressure-giving mechanism for propulsion carried thereby, a suitable valve or cock, tappet-rod, tappet-plates, sector or rack carrying a tappet-pin, and a pinion frictionally attached to the body to be reversed, giving movement to the other members, in the manner specified, as and for the purpose described.

In testimony whereof I have affixed my signature in presence of two witnesses.

WILLIAM B. YATES

Witnesses:
LUCIEN I. YEOMANS.
F. O. YEOMANS.